(12) United States Patent
Abhau

(10) Patent No.: US 10,821,896 B2
(45) Date of Patent: *Nov. 3, 2020

(54) MULTI-CAMERA DRIVER ASSISTANCE SYSTEM

(71) Applicant: MANDO CORPORATION, Gyeonggi-do (KR)

(72) Inventor: Jochen Abhau, Frankfurt am Main (DE)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/584,932

(22) Filed: Sep. 26, 2019

(65) Prior Publication Data

US 2020/0023773 A1 Jan. 23, 2020

Related U.S. Application Data

(63) Continuation of application No. 15/134,293, filed on Apr. 20, 2016, now Pat. No. 10,464,481.

(30) Foreign Application Priority Data

Apr. 21, 2015 (KR) .......................... 10-2015-0056085

(51) Int. Cl.
*B60R 1/00* (2006.01)
*H04N 7/18* (2006.01)
(Continued)

(52) U.S. Cl.
CPC ................ *B60R 1/00* (2013.01); *G06T 15/04* (2013.01); *G06T 15/20* (2013.01); *H04N 7/181* (2013.01);
(Continued)

(58) Field of Classification Search
CPC ..... B60R 1/00; B60R 2300/607; G06T 15/20; G06T 15/04; G06T 2215/12; H04N 7/181
See application file for complete search history.

(56) References Cited

U.S. PATENT DOCUMENTS

| 8,576,285 B2 * | 11/2013 | Gomi | ..................... H04N 7/181 |
| | | | 348/148 |
| 2012/0154591 A1 * | 6/2012 | Baur | ......................... B60R 1/00 |
| | | | 348/148 |

(Continued)

FOREIGN PATENT DOCUMENTS

| DE | 600 03 750 | 6/2004 |
| DE | 10 2013 220 005 | 4/2015 |

(Continued)

OTHER PUBLICATIONS

Notice of Allowance dated Jun. 26, 2019 for U.S. Appl. No. 15/134,293 (now published as 2016/0311373).

(Continued)

*Primary Examiner* — Richard A Hansell Jr.
(74) *Attorney, Agent, or Firm* — Ladas & Parry, LLP

(57) ABSTRACT

Disclosed herein is a multi-camera driver assistance system. The system includes a plurality of cameras which dispose at different positions of a vehicle to capture images of a vicinity of the vehicle; an image processing unit which generates a virtual view with respect to a predetermined projection surface based on the images; and a display device which displays the virtual view, wherein the predetermined projection surface includes a slanted projection surfaces which are located at lateral sides of the vehicle.

8 Claims, 9 Drawing Sheets

(51) Int. Cl.
*G06T 15/20* (2011.01)
*G06T 15/04* (2011.01)

(52) U.S. Cl.
CPC ..... *B60R 2300/607* (2013.01); *G06T 2215/12* (2013.01)

(56) References Cited

U.S. PATENT DOCUMENTS

| | | | | |
|---|---|---|---|---|
| 2012/0218412 | A1* | 8/2012 | Dellantoni | G01C 21/3602 |
| | | | | 348/148 |
| 2012/0262580 | A1* | 10/2012 | Huebner | G06K 9/00791 |
| | | | | 348/148 |
| 2012/0287232 | A1* | 11/2012 | Natroshvili | G06T 7/33 |
| | | | | 348/36 |
| 2012/0320190 | A1* | 12/2012 | Natroshvili | G06T 7/85 |
| | | | | 348/135 |
| 2013/0338882 | A1* | 12/2013 | Baur | B60R 1/088 |
| | | | | 701/48 |
| 2015/0302561 | A1* | 10/2015 | Pekkucuksen | G06T 7/337 |
| | | | | 382/275 |
| 2016/0221503 | A1* | 8/2016 | Krokel | B60R 1/00 |
| 2016/0311373 | A1 | 10/2016 | Abhau | |
| 2017/0203692 | A1* | 7/2017 | Friebe | B60R 1/00 |

FOREIGN PATENT DOCUMENTS

| | | | | |
|---|---|---|---|---|
| DE | 102013220005 | A1 * | 4/2015 | ............... G06T 7/60 |
| DE | 10 2014 208 664 | | 11/2015 | |
| DE | 102014208664 | A1 * | 11/2015 | ............... B60R 1/00 |
| EP | 2 511 137 | | 10/2012 | |

OTHER PUBLICATIONS

Advisory Action dated Oct. 16, 2018 for U.S. Appl. No. 15/134,293 (now published as 2016/0311373).
Final Office Action dated Jun. 12, 2018 for U.S. Appl. No. 15/134,293 (now published as 2016/0311373).
Non-Office Action dated Nov. 16, 2017 for U.S. Appl. No. 15/134,293 (now published as 2016/0311373).

* cited by examiner

MULTI-CAMERA DRIVER ASSISTANCE SYSTEM

CROSS-REFERENCE TO RELATED APPLICATION

This application is a continuation of U.S. patent application Ser. No. 15/134,293 filed on Apr. 20, 2016, which claims the priority to Korean Patent Application No. 10-2015-0056085, filed on Apr. 21, 2015 in the Korean Intellectual Property Office, the disclosure of which is incorporated herein by reference in its entirety.

BACKGROUND

1. Field

Embodiments of the present disclosure relate to a system for assisting a driver using multiple cameras, and more particularly, to a multi-camera driver assistance system capable of displaying objects such as passengers at high positions without distortion (distortion free) and displaying straight lines of vehicles passing around a vehicle as accurate straight lines rather than arcs by providing a virtual view of a vicinity of the vehicle when driving or parking the vehicle.

2. Description of the Related Art

A multi-camera driver assistance system is a system which provides a virtual view around a vehicle by combining images captured by a plurality of cameras which are attached at different positions of the vehicle. Such a multi-camera driver assistance system is also referred to as a surround view system. The multi-camera driver assistance system may provide convenience of a user's operation when a driver is parking or the like.

Specifically, large vehicles such as buses may cause complex situations. For example, complex situations may occur due to passengers who get on and off the buses and vehicles passing around the buses.

A conventional multi-camera driver assistance system uses a flat projection surface to generate a virtual view. The flat projection surface is provided in, for example, European Patent Application No. DE 60003750 T2. In the virtual view using the flat projection surface, although straightened lines of parking lines, vehicles passing around a vehicle, or the like are represented as straight lines similar to actual lines, there is a disadvantage in that heights of objects such as structures, trees, and the like in an external environment of the vehicle are not represented.

Further, the conventional multi-camera driver assistance system uses a bowl projection surface to generate a virtual view. The bowl projection surface is provided in, for example, European Patent Publication No. EP 2511137 A1. In the virtual view using the bowl projection surface, although heights of objects in an external environment of a vehicle are represented similar to actual heights, there is a problem in that distortion such as straightened lines represented as curved lines or the like occurs.

SUMMARY

Therefore, it is an aspect of the present disclosure to provide a multi-camera driver assistance system capable of representing a height of an object in the external environment of a vehicle similar to an actual height, and at the same time, representing straightened lines of parking lines, vehicles passing around the vehicle, or the like as straight lines similar to actual lines.

In accordance with one aspect of the present invention, a multi-camera driver assistance system includes a plurality of cameras which dispose at different positions of a vehicle to capture images of a vicinity of the vehicle; an image processing unit which generates a virtual view with respect to a predetermined projection surface based on the images; and a display device which displays the virtual view; and predetermined projection surface may include a slanted projection surfaces which are located at lateral sides of the vehicle.

The image processing unit may be an electronic processing unit (ECU) in the vehicle.

The predetermined projection surface may further include a flat projection surface having a predetermined distance around the vehicle and the slanted projection surface may be connected to the flat projection surface.

The predetermined projection surface may further includes vertical projection surfaces which are located in front and behind the vehicle, and approximately perpendicular to the ground to limit the slanted projection surface.

The image processing unit may be configured to increase the predetermined distance of the flat projection surface, and to increase angles of the slanted projection surface from the ground in respond to a command of a user which inputs a virtual view expanding command.

The image processing unit may be configured to decrease the predetermined distance of the flat projection surface, and to decrease angles of the slanted projection surface from the ground in respond to the command of the user which inputs a virtual view contracting command.

In accordance with another aspect of the present invention, a method of displaying a virtual image by a multi-camera driver assistance system, the method comprising: receiving a plurality of captured images of a vicinity of a vehicle which disposes at different positions of the vehicle; generating a virtual view with respect to a predetermined projection surface based on the images; and transmitting the virtual view to a display device; wherein the predetermined projection surface may include a slanted projection surfaces which are located at lateral sides of the vehicle.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1A:
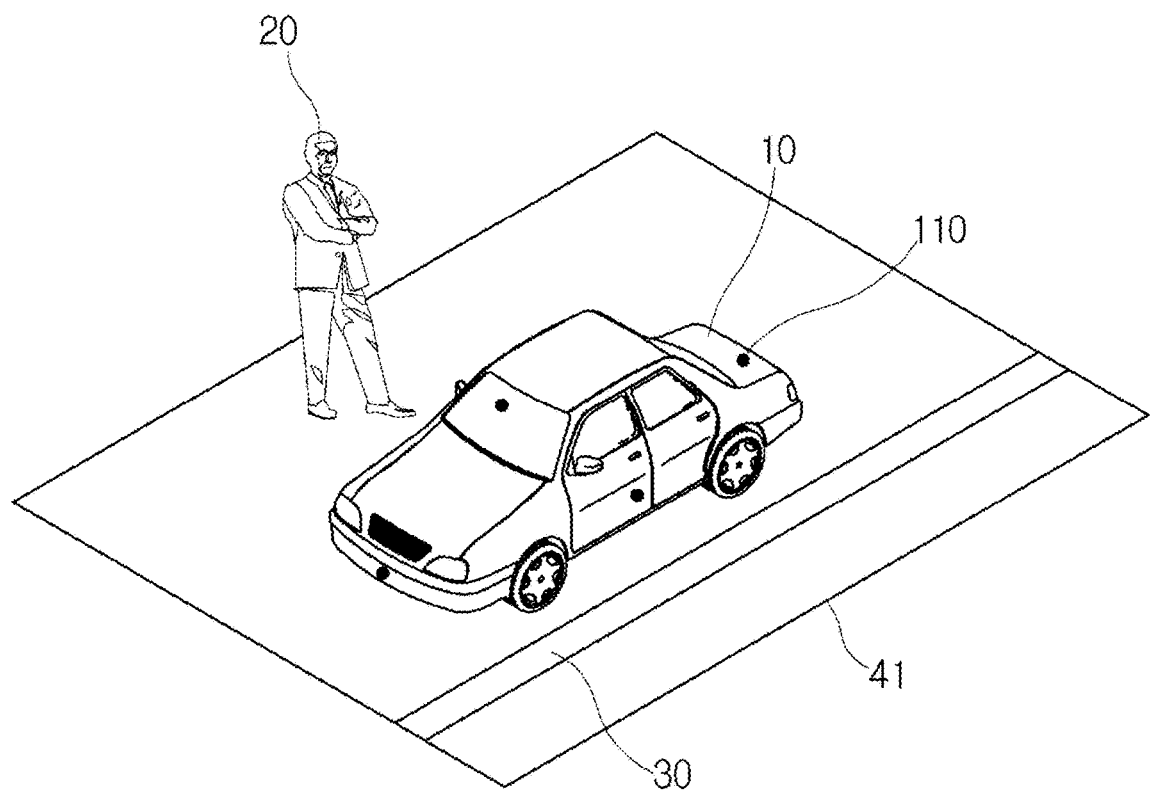
FIG. 1A is a view illustrating a virtual view with respect to a flat projection surface generated by a multi-camera driver assistance system in accordance with the related art.

In the following description of the present disclosure, when it is determined that detailed descriptions of related well-known functions or configurations unnecessarily obscure the gist of the present disclosure, the detailed descriptions thereof will be omitted.

While the disclosure may be modified in various ways and take on various alternative forms, specific embodiments thereof are shown in the drawings and described in detail below as examples. There is no intent to limit the disclosure to the particular forms disclosed. On the contrary, the disclosure is construed as including all modifications, equivalents, and alternatives falling within the spirit and scope of the appended claims.

Figure 1B:
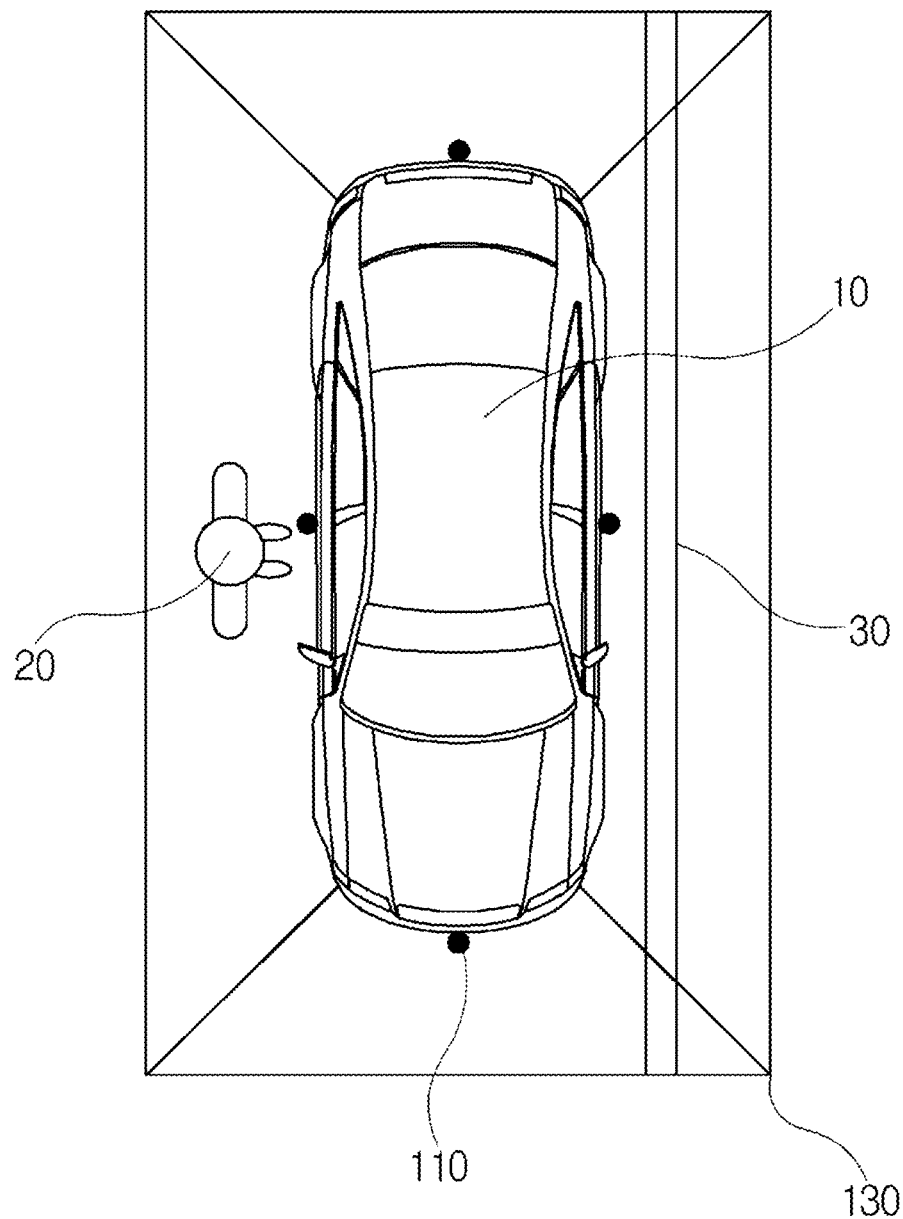
FIG. 1B is a view illustrating a screen on which the virtual view generated by the flat projection surface is displayed by a display device.

FIG. 1A is a view illustrating a virtual view with respect to a flat projection surface generated by a multi-camera driver assistance system in accordance with the related art. FIG. 1B is a view illustrating a screen on which the virtual view generated by the flat projection surface is displayed by a display device.

Referring to FIGS. 1A and 1B, a vehicle 10, a passenger 20, which may be represented as a high object, and a parking line 30, which may be represented as a straightened line, are illustrated.

The vehicle 10, which is an object that mounts a motor and moves on the ground by rolling wheels with the power of the motor, may be, for example, a car, a bus, a truck, and the like.

A plurality of cameras 110 are disposed at different positions of the vehicle 10. For example, the cameras 110 may be respectively disposed on a front surface, a left surface, a right surface, and a rear surface of the vehicle 10. The cameras 110 may be, for example, wide angle cameras that may perform capturing within a range of 180 degrees. As the plurality of cameras 110 are disposed on a single vehicle 10, a virtual view (or a surround view) around the vehicle 10 may be provided to a user.

The virtual view may be generated by an image processing unit (not illustrated). The image processing unit receives a plurality of captured images from the cameras 110, and generates a virtual view which represents a vicinity of the vehicle 10 by processing the plurality of images. That is, the image processing unit performs processing, such as rotation, reversing, size adjusting, color correction, and the like, on the plurality of images, instead of simply combining the plurality of images. The image processing unit generates the virtual view by combining the processed images. That is, the virtual view refers to a combination of the images based on a surface at which a virtual observer, who does not actually exist, watches. The image processing unit may be, for example, an electronic control unit (ECU) installed in the vehicle 10. The virtual view may be displayed on a display device 130 installed in the vehicle 10.

In FIGS. 1A and 1B, a case in which a flat projection surface 41 is used for generating the virtual view is illustrated. Since a two-dimensional (2D) ground around the vehicle 10, on which the vehicle 10 is located, becomes a surface for the virtual view, a passenger 20 in the vicinity of the vehicle 10 is displayed as a single point. That is, the passenger 20 which is a high object is displayed on a 2D surface as a single point, and thus a height of the passenger 20 is not displayed on the display device 130. Meanwhile, a parking line 30 in the vicinity of the vehicle 10 is also displayed on the 2D surface as a straight line.

Figure 2A:
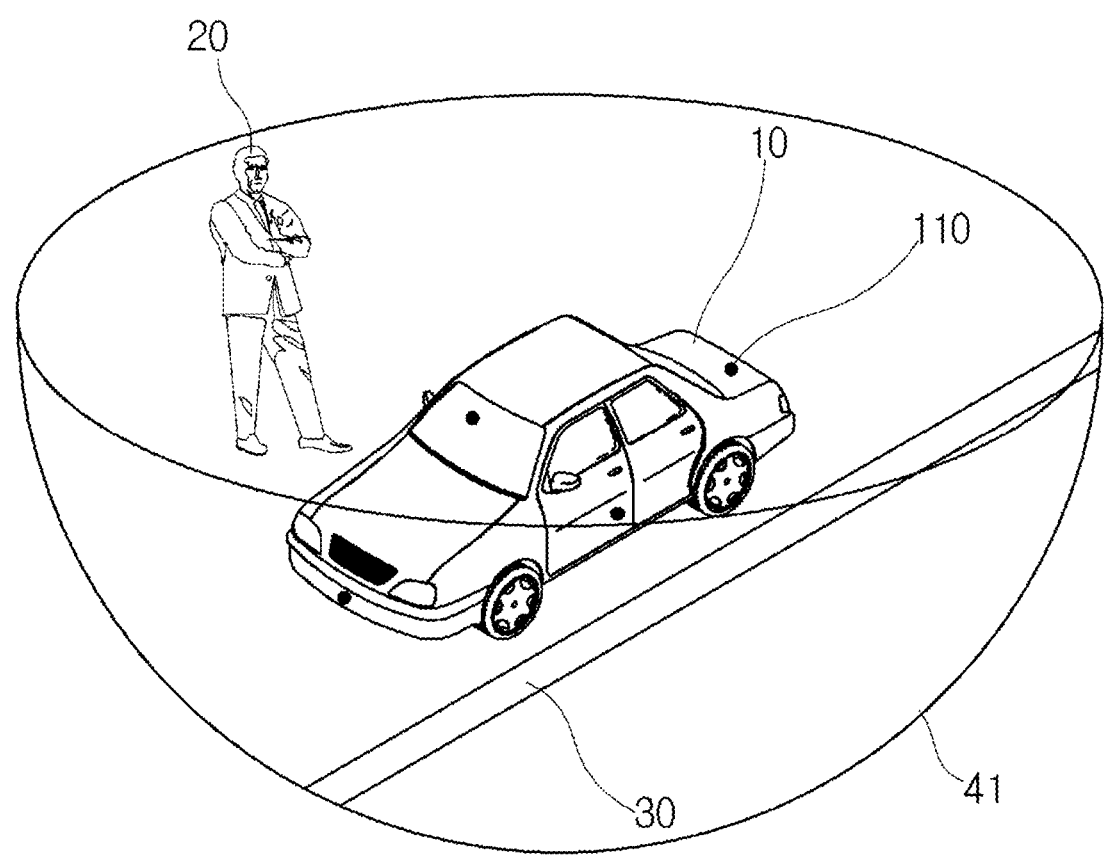
FIG. 2A is a view illustrating a virtual view with respect to a bowl projection surface generated by a multi-camera driver assistance system in accordance with the related art.
Figure 2B:
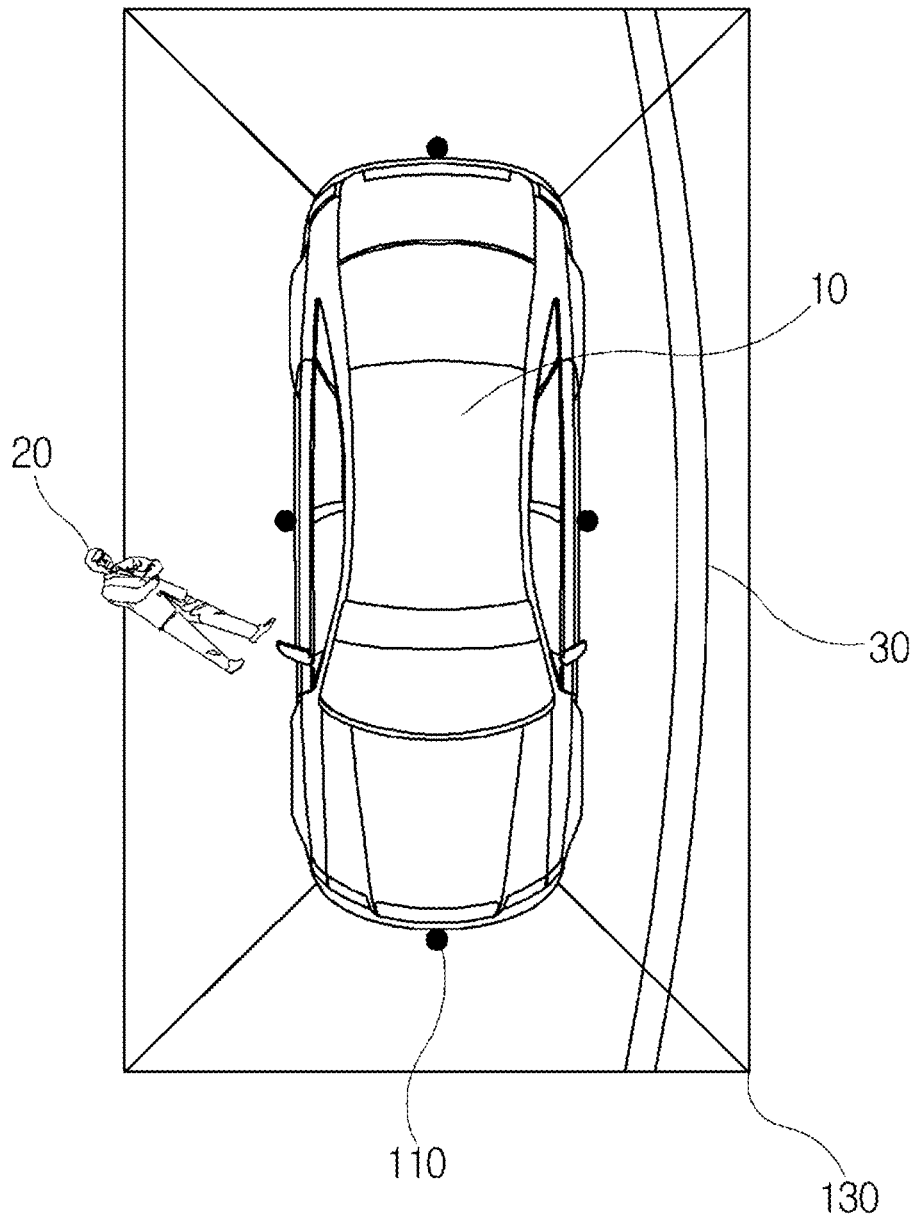
FIG. 2B is a view illustrating a screen on which the virtual view generated by the bowl projection surface is displayed by a display device.

FIG. 2A is a view illustrating a virtual view with respect to a bowl projection surface generated by a multi-camera driver assistance system in accordance with the related art. FIG. 2B is a view illustrating a screen on which the virtual view generated by the bowl projection surface is displayed by a display device.

Referring to FIGS. 2A and 2B, a vehicle 10, a passenger 20, which may be represented as a high object, and a parking line 30, which may be represented as a straightened line, are illustrated.

A virtual view may be generated by an image processing unit (not illustrated). The image processing unit receives a plurality of captured images from cameras 110, and generates a virtual view which represents a vicinity of the vehicle 10 by processing the plurality of images. That is, the image processing unit performs processing, such as rotation, reversing, size adjusting, color correction, and the like, on the plurality of images, instead of simply combining the plurality of images. The image processing unit generates the virtual view by combining the processed images. That is, the virtual view refers to a combination of the images based on a surface at which a virtual observer, who does not actually exist, watches. The image processing unit may be, for example, an ECU installed in the vehicle 10. The virtual view may be displayed on a display device 130 installed in the vehicle 10.

In FIGS. 2A and 2B, a case in which a bowl projection surface 41 is used for generating the virtual view is illustrated. Since a three-dimensional (3D) shape having a bowl shape becomes a surface for the virtual view around the vehicle 10, a passenger 20 in the vicinity of the vehicle 10 is displayed so that a height thereof is represented. However, although a parking line 30 in the vicinity of the vehicle 10 is actually a straight line, the parking line 30 is displayed as a curved line in the virtual view. That is, in the bowl projection surface 41, the parking line 30 is represented to be distorted.

Figure 3A:
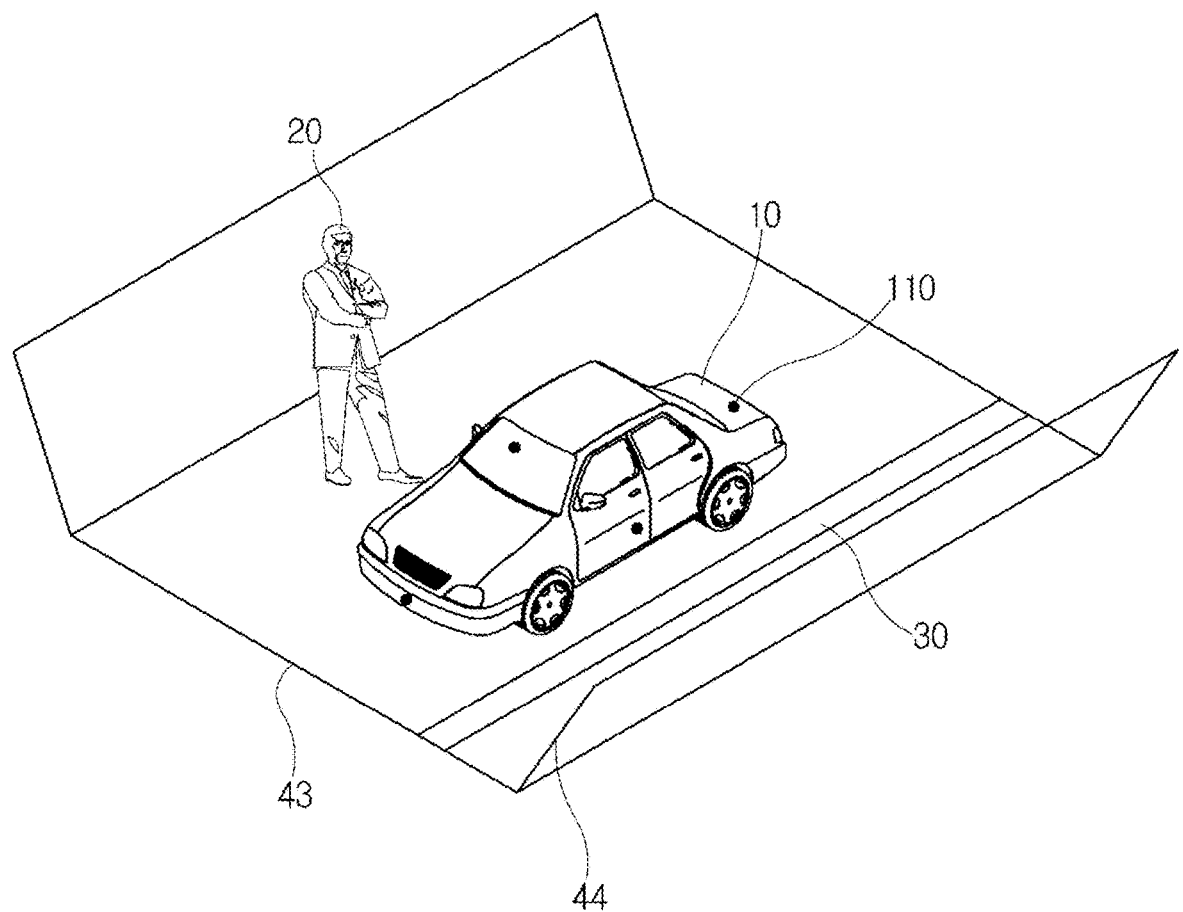
FIG. 3A is a view illustrating a virtual view with respect to a projection surface generated by a multi-camera driver assistance system in accordance with one embodiment of the present disclosure.
Figure 3B:
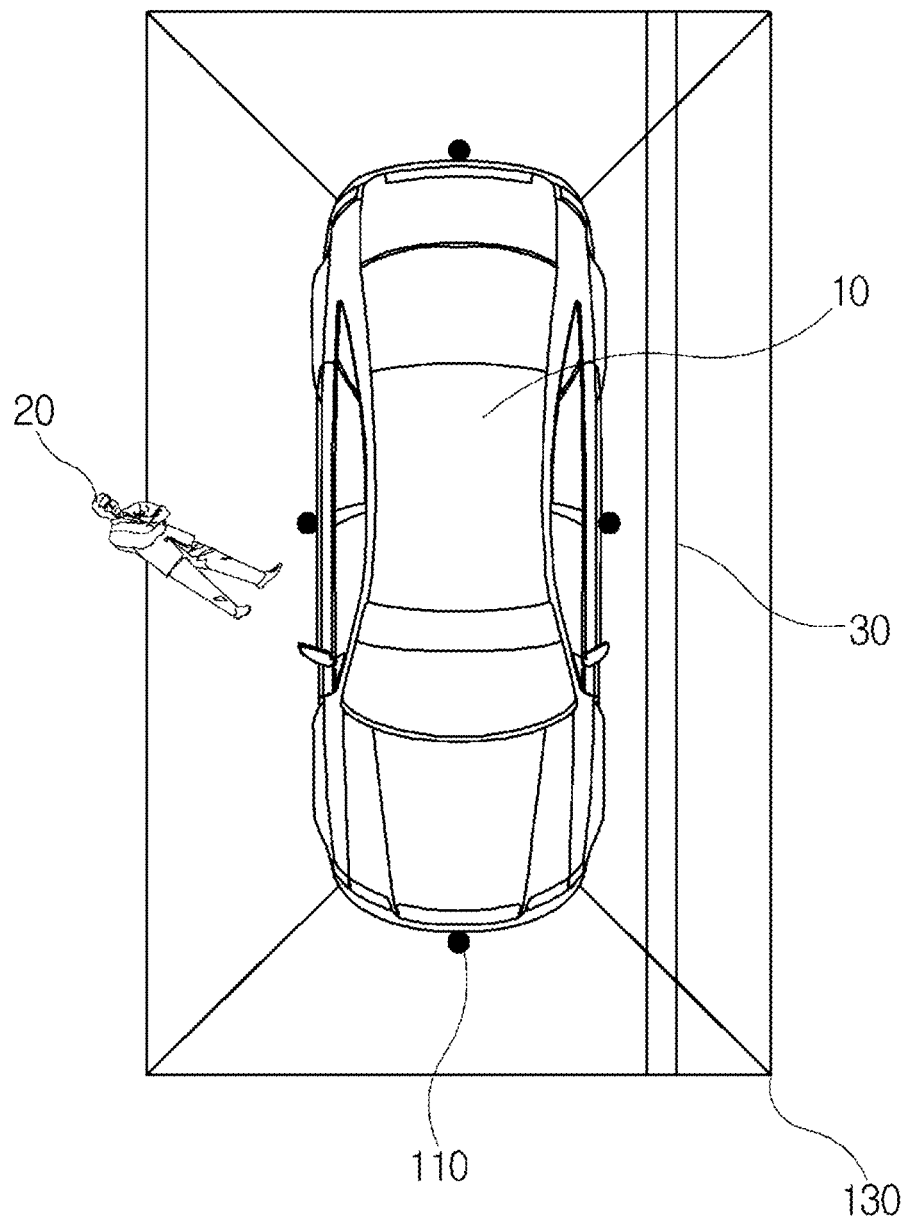
FIG. 3B is a view illustrating a screen on which the virtual view generated by the projection surface in accordance with the present disclosure is displayed by a display device.
Figure 3C:
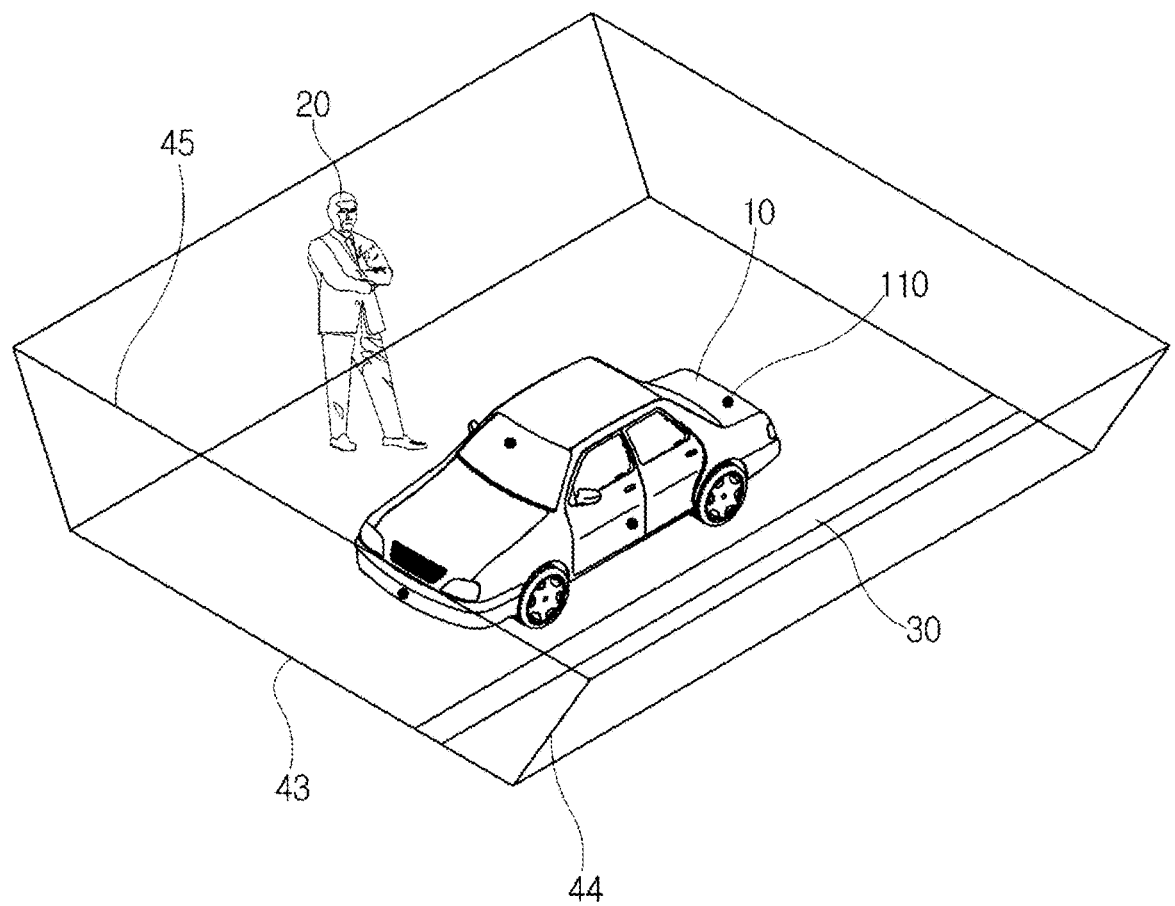
FIG. 3C is a view illustrating a virtual view with respect to a projection surface generated by a multi-camera driver assistance system in accordance with another embodiment of the present disclosure.

FIG. 3A is a view illustrating a virtual view with respect to a projection surface generated by a multi-camera driver assistance system in accordance with one embodiment of the present disclosure. FIG. 3B is a view illustrating a screen on which the virtual view generated by the projection surface in accordance with the present disclosure is displayed by a display device. FIG. 3C is a view illustrating a virtual view with respect to a projection surface generated by a multi-camera driver assistance system in accordance with another embodiment of the present disclosure.

A virtual view may be generated by an image processing unit (not illustrated). The image processing unit receives a plurality of captured images from cameras 110, and generates a virtual view which represents a vicinity of a vehicle 10 by processing the plurality of images. That is, the image processing unit performs processing, such as rotation, reversing, size adjusting, color correction, and the like, on the plurality of images, instead of simply combining the plurality of images. The image processing unit generates the virtual view by combining the processed images. That is, the virtual view refers to a combination of the images based on a surface at which a virtual observer, who does not actually exist, watches. The image processing unit may be, for example, an ECU installed in the vehicle 10. The virtual view may be displayed on a display device 130 installed in the vehicle 10.

The projection surface in accordance with the present disclosure includes slanted projection surfaces 44. The slanted projection surfaces 44 are located to lateral sides of the vehicle 10, and are configured to be inclined from the ground by a predetermined angle. Since the slanted projection surfaces 44 are 2D surfaces and are surfaces which are inclined and raised from the ground, a passenger 20 in the vicinity of the vehicle 10 may not be displayed as a single point and may be represented as an object having a height. Further, since the slanted projection surfaces 44 are the 2D surfaces rather than curved surfaces, a parking line 30 in the vicinity of the vehicle, which is actually a straight line, may not be represented to be curved, and may be represented as a straight line the same as an actual line.

According to another embodiment of the present disclosure, the multi-camera driver assistance system may include a flat projection surface 43 with a predetermined distance around a vehicle 10, and slanted projection surfaces 44 connected to the flat projection surface 43. In a predetermined distance adjacent to the vehicle 10, since a virtual view with respect to the flat projection surface 43 is generated, a parking line 30 very close to the vehicle 10 may be represented as being in the ground without the distortion of the height.

Additionally, the projection surface in accordance with the present disclosure may further include vertical projection surfaces 45 which are located in front and behind the vehicle 10 and are almost perpendicular to the ground. In FIG. 3C, the vertical projection surfaces 45 almost perpendicular to the ground are illustrated to be located in front and behind the vehicle 10. These vertical projection surfaces 45 may limit the infinite expansion of the slanted projection surfaces 44.

Meanwhile, a shape of the projection surface in accordance with the present disclosure may be changed by a command of a user. For example, the user may wish to expand the virtual view in order to more specifically recognize an environment in the vicinity of the vehicle 10. Thus, when the user transmits a virtual view expanding command, the image processing unit may increase the predetermined distance of the flat projection surface 43, and at the same time, may increase angles of the slanted projection surfaces 44 from the ground. Therefore, the parking line 30 in the vicinity of the vehicle 10 may be expanded and displayed on the display device 30, and a height of the passenger 20 may be displayed on the display device 30 in more detail.

When the user transmits a virtual view contracting command, the image processing unit may decrease the predetermined distance of the flat projection surface 43, and at the same time, may decrease the angles of the slanted projection surfaces 44 from the ground. Therefore, the parking line 30 in the vicinity of the vehicle 10 may be contracted and displayed on the display device 30, and the height of the passenger 20 may be displayed on the display device 30 in less detail.

Figure 4:
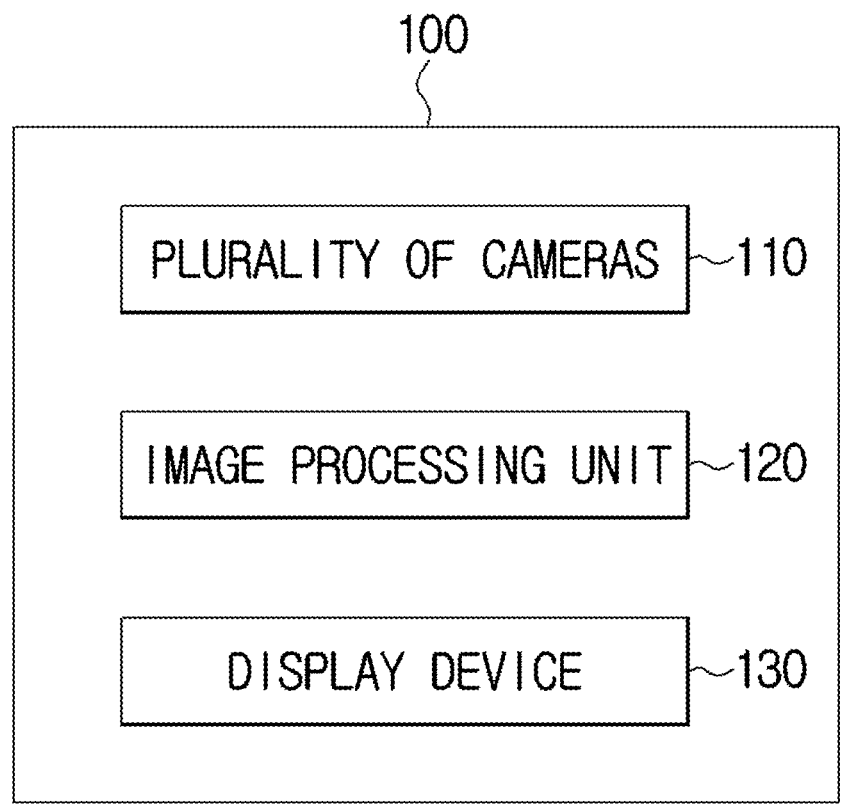
FIG. 4 is a block diagram illustrating a multi-camera driver assistance system in accordance with the present disclosure.

FIG. 4 is a block diagram illustrating a multi-camera driver assistance system in accordance with the present disclosure.

The multi-camera driver assistance system in accordance with the present disclosure includes a plurality of cameras 110, an image processing unit 120, and a display device 130.

The plurality of cameras 110 may be disposed at different positions of a vehicle. For example, the cameras 110 may be respectively disposed on a front surface, a left surface, a right surface, and a rear surface of the vehicle. The cameras 110 may be, for example, wide angle cameras that may perform capturing within a range of 180 degrees. As the plurality of cameras 110 are disposed on a single vehicle 10, a virtual view (or a surround view) around the vehicle may be provided to a user.

The image processing unit 120 may generate a virtual view. The image processing unit 120 receives a plurality of captured images from the cameras 110, and generates the virtual view which represents a vicinity of the vehicle by processing the plurality of images. That is, the image processing unit 120 performs processing, such as rotation, reversing, size adjusting, color correction, and the like, on the plurality of images instead of simply combining the plurality of images. The image processing unit 120 combines the images processed as above. The image processing unit 120 may be, for example, an ECU installed in the vehicle.

The display device 130 may receive the virtual view from the image processing unit 120 and display the virtual view to the user. For example, the display device 130 may be a monitor device located in the vehicle. For example, the display device 130 may be implemented using a liquid crystal display (LCD), a light-emitting diode (LED), an organic light-emitting diode (OLED), and the like.

Figure 5:
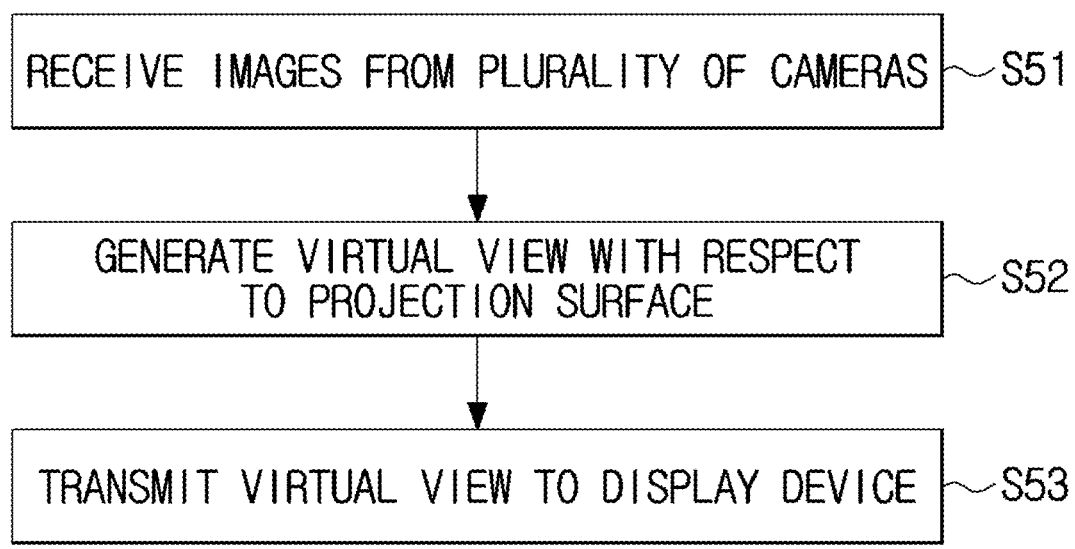
FIG. 5 is a flowchart illustrating a method of displaying a virtual view by a multi-camera driver assistance system in accordance with another aspect of the present disclosure. The method may be performed by an image processing unit.

FIG. 5 is a flowchart illustrating a method of displaying a virtual view by a multi-camera driver assistance system in accordance with another aspect of the present disclosure. The method may be performed by an image processing unit.

Images of a vicinity of a vehicle may be received from a plurality of cameras disposed at different positions of the vehicle (S51).

A virtual view with respect to a predetermined projection surface may be generated based on the images (S52). According to the present disclosure, the predetermined projection surface may include a flat projection surface having a predetermined distance around the vehicle and slanted projection surfaces, which are connected to the flat projection surface and are inclined from the ground by a predetermined angle, to lateral sides of the vehicle. Further, the predetermined projection surface may also include vertical projection surfaces which are located to the front and rear of the vehicle in order to limit the infinite expansion of the slanted projection surface and having a shape almost perpendicular to the ground.

The virtual view may be changed by a command of a user. For example, when a virtual view expanding command is received from the user, the predetermined distance of the flat projection surface may be increased and angles of the slanted projection surfaces from the ground may be increased. On the other hand, when a virtual view contracting command is received from the user, the predetermined distance of the flat projection surface may be decreased and the angles of the slanted projection surfaces from the ground may be decreased.

The generated virtual view may be transmitted to a display device (S53), and the display device may assist the driving of the user by displaying the virtual view.

In one or more exemplary embodiments, the described functions may be implemented in hardware, software, firmware, or any combinations thereof. When being implemented in software, the functions may be stored in or transmitted to a computer readable medium as one or more instructions or codes. The computer readable medium includes both a communication medium including any medium that facilitates transferring computer programs from one place to another place and a computer recording medium. The recording medium may be any available medium that can be accessed by a computer. As an example rather than a limitation, such computer readable medium may include a read only memory (ROM), a random access memory (RAM), an electrically erasable programmable read only memory (EEPROM), a compact disk read only memory (CD-ROM) or other optical disk storages, a magnetic disk storage or other magnetic storage devices, or any other medium that can be used to transfer and store desired program codes in a form of an instruction or a data structure and can be accessed by a computer. Further, any connection may be appropriately referred to as the computer readable medium. For example, when software is transmitted from a website, a server, or another remote source using a coaxial cable, a fiber optic cable, a pair of twisted lines, a digital subscriber line (DSL), or wireless techniques such as infrared light, a radio frequency, and a super high frequency, the coaxial cable, the fiber optic cable, the pair of twisted lines, the DSL, or the wireless techniques such as the infrared light, the radio frequency, and the super high frequency are included in the definition of a medium. Disks and discs used herein include a CD, a laser disc, an optical disc, a digital versatile disc (DVD), a floppy disk, and a Blue-ray disc, where the disks normally play data magnetically and the discs play data optically using a laser. The above combinations should also be included within the scope of the computer readable medium.

When embodiments are implemented in program codes or code segments, it should be recognized that the code segment may represent a procedure, a function, a subprogram, a program, a routine, a subroutine, a module, a software package, a class, instructions, data structures, program statements, or any combinations thereof. As the code segment transmits and/or receives information, data, arguments, parameters, or memory contents, the code segment may be connected to the other code segment or a hardware circuit. The information, arguments, parameters, data, or the like may be transferred, sent, or transmitted using any appropriate means including memory sharing, message passing, token passing, network transmission, etc. In addition, in some aspects, methods or steps and/or operations of an algorithm may be provided as one of codes and/or instructions or any combination or set thereof on a machine-readable medium and/or the computer readable medium that can be integrated into a computer program object.

In the software implementation, the techniques described herein may be implemented with modules (e.g., procedures, function, and the like) for performing the functions described herein. Software codes may be stored in memory units and executed by processors. The memory units may be implemented in the processor and outside the processor, and in this case, the memory units may be connected to communicate with the processor by various known means.

In the hardware implementation, processing units may be implemented in one or more application specific integrated circuits (ASIC), a digital signal processor (DSP), a digital signal processing device (DSPD), a programmable logic device (PLD), a field programmable gate array (FPGA), a processor, a controller, a micro-controller, a microprocessor, other electronic units which are designed to perform the functions described herein, or any combination thereof.

The above-described embodiments include real examples of one or more embodiments. Although not all possible combinations of the components or the methods for describing the above-described embodiments can be described, those skilled in the art may recognize additional combinations and replacements of the various embodiments. Therefore, the above-described embodiments include all alternatives, modifications, and changes within the spirit and the scope of the appended claims. Furthermore, in the detailed description and the scope of the claims where the term "include" is used, as the term is interpreted when the term "comprise" is inclusively used as a word in the scope of the claims, the term "comprise" is similarly included therein.

As used herein, the term "construe" or "construction" generally refers to a process which determines or construes with respect to a system, an environment, and/or a state of the user from a set of observations captured from an event and/or data. The construction may be used to identify a particular situation or operation, or for example, may generate a probability distribution over states. The construction may be a probability, that is, it may be the computation of a probability distribution over the states based on a consideration of the data and events. Further, the construction may also refer to techniques used to construct higher-level events from a set of events and/or data. The construction estimates a set of observed events, new events or operations from stored event data, whether the events are closely correlated in time, and whether the events and data come out from one or several events and data sources.

Furthermore, as used in this application, the terms "component," "module," "system," and the like include an entity related to a computer such as hardware, firmware, a combination of hardware and software, software, or running software, but are not limited thereto. For example, a component includes a process executed on a processor, a processor, an object, an executable running thread, a program, and/or a computer, but is not limited thereto. As an example, both an application executed on a computing device and the computing device may be a component. One or more components may be provided in the process and/or a running thread, integrated into a single computer, and/or distributed to two or more computers. Further, these components may be executed in various computer readable media in which various data structures are stored. The components may communicate by a local and/or a remote process according to a signal having one or more data packets (e.g., data from a local system, another component of a distributed system, and/or any component that interacts with other systems by a signal through a network such as the Internet), and the like.

According to the present disclosure a virtual view may be provided in which a height of an object in the external environment of a vehicle is represented as that of an object having a height similar to an actual height.

Further, according to the present disclosure, a virtual view may also be provided in which straightened lines of parking lines, vehicles passing around a vehicle, or the like are represented as straight lines similar to actual lines.

Although a few embodiments of the present disclosure have been shown and described, it should be appreciated by those skilled in the art that changes may be made in these embodiments without departing from the principles and spirit of the disclosure, the scope of which is defined in the claims and their equivalents.

What is claimed is:
1. A vision system for a vehicle, the vision system comprising:

a camera operable to be disposed at the vehicle so as to have a field of view exterior of the vehicle, the camera configured to capture an image data; and an image processor configured to process the image data captured by the camera, wherein the image processor is configured to, responsive at least in part to image processing of image data, output a first virtual view including a first flat projection surface extending from the vehicle by a first distance and a first slanted projection surface slanted by a first angle relative to the first flat projection surface and positioned at the first distance from the vehicle, and the image processor is configured to, in response to a user input, output a second virtual view including a second flat projection surface extending from the vehicle by a second distance, which is greater than the first distance, and a second slanted projection surface positioned at the second distance from the vehicle and slanted by a second angle, which is greater than the first angle, relative to the second flat projection surface.

2. A vision system for a vehicle, the vision system comprising:

a camera operable to be disposed at the vehicle so as to have a field of view exterior of the vehicle, the camera configured to capture an image data; and an image processor configured to process the image data captured by the camera, wherein the image processor is configured to, responsive at least in part to image processing of image data, output a first virtual view including a first flat projection surface extending from the vehicle by a first distance and a first slanted projection surface slanted by a first angle relative to the first flat projection surface and positioned at the first distance from the vehicle, and the image processor is configured to, in response to a user input, output a second virtual view including a second flat projection surface extending from the vehicle by a second distance, which is less than the first distance, and a second slanted projection surface positioned at the second distance and slanted by a second angle, which is less than the first angle, relative to the second flat projection surface.

3. The vision system of claim 1, wherein at least one of the first virtual view and the second virtual view is displayed on a display disposed at the vehicle.

4. A controlling method of a vision system for a vehicle, the method comprising:

capturing, by a camera operable to be disposed at the vehicle so as to have a field of view exterior of the vehicle, an image data;

processing, by an image processor, the image data captured by the camera;

responsive at least in part to image processing of image data, outputting a first virtual view including a first flat projection surface extending from the vehicle by a first distance and a first slanted projection surface slanted by a first angle relative to the first flat projection surface and positioned at the first distance from the vehicle; and in response to a user input, outputting a second virtual view including a second flat projection surface extending from the vehicle by a second distance, which is greater than the first distance, and a second slanted projection surface slanted by a second angle, which is greater than the first angle, relative to the second flat projection surface and positioned at the second distance from the vehicle.

5. A controlling method of a vision system for a vehicle, the method comprising:

capturing, by a camera operable to be disposed at the vehicle so as to have a field of view exterior of the vehicle, an image data;

processing, by an image processor, the image data captured by the camera;

responsive at least in part to image processing of image data, outputting a first virtual view including a first flat projection surface extending from the vehicle by a first distance and a first slanted projection surface slanted by a first angle relative to the first flat projection surface and positioned at the first distance from the vehicle; and in response to a user input outputting a second virtual view including a second flat projection surface extending from the vehicle by a second distance, which is less than the first distance, and a second slanted projection surface positioned at the second distance and slanted by a second angle, which is less than the first angle, relative to the second flat projection surface.

6. The controlling method of claim 4, further comprising displaying at least one of the first virtual view and the second virtual view.

7. The vision system of claim 2, wherein at least one of the first virtual view and the second virtual view is displayed on a display disposed at the vehicle.

8. The controlling method of claim 5, further comprising displaying at least one of the first virtual view and the second virtual view.

* * * * *